(12) United States Patent
Maruyama et al.

(10) Patent No.: US 8,788,735 B2
(45) Date of Patent: Jul. 22, 2014

(54) INTERRUPT CONTROL APPARATUS, INTERRUPT CONTROL SYSTEM, INTERRUPT CONTROL METHOD, AND INTERRUPT CONTROL PROGRAM

(75) Inventors: Tatsuya Maruyama, Hitachi (JP); Tsutomu Yamada, Hitachinaka (JP); Norihisa Yanagihara, Tokyo (JP); Shinji Yonemoto, Narashino (JP); Takashi Iwaki, Ichihara (JP); Hiroshi Fujii, Chiba (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 779 days.

(21) Appl. No.: 12/544,347

(22) Filed: Aug. 20, 2009

(65) Prior Publication Data

US 2010/0070668 A1 Mar. 18, 2010

(30) Foreign Application Priority Data

Sep. 18, 2008 (JP) ................................. 2008-239230

(51) Int. Cl.
*G06F 13/24* (2006.01)
(52) U.S. Cl.
USPC ........................................... 710/261; 710/262
(58) Field of Classification Search
USPC ................. 710/260, 261, 262, 264, 266–268
See application file for complete search history.

(56) References Cited

U.S. PATENT DOCUMENTS

| | | | | |
|---|---|---|---|---|
| 3,286,239 A | * | 11/1966 | Thompson et al. ............. | 714/22 |
| 4,159,516 A | * | 6/1979 | Henrion et al. ................. | 710/49 |
| 4,218,739 A | * | 8/1980 | Negi et al. ...................... | 710/262 |
| 4,282,573 A | * | 8/1981 | Imai et al. ...................... | 701/114 |
| 5,659,758 A | * | 8/1997 | Gentry et al. .................. | 710/260 |
| 5,682,491 A | * | 10/1997 | Pechanek et al. ............. | 712/209 |
| 6,115,776 A | * | 9/2000 | Reid et al. ...................... | 710/260 |
| 6,253,307 B1 | * | 6/2001 | Boutaud et al. ............... | 712/209 |
| 6,467,008 B1 | * | 10/2002 | Gentry et al. .................. | 710/261 |
| 6,606,677 B1 | * | 8/2003 | Okbay et al. .................. | 710/262 |
| 6,813,665 B2 | * | 11/2004 | Rankin et al. ................. | 710/260 |
| 7,274,699 B2 | * | 9/2007 | Allen .............................. | 370/392 |
| 7,421,521 B2 | * | 9/2008 | Trainin .......................... | 710/45 |
| 7,882,293 B2 | * | 2/2011 | Burdass et al. ............... | 710/262 |
| 2003/0167366 A1 | * | 9/2003 | Radhakrishna ............... | 710/262 |

FOREIGN PATENT DOCUMENTS

| | | |
|---|---|---|
| JP | 7-146797 | 6/1995 |
| JP | 08-287003 | 11/1996 |
| JP | 2003-524312 | 8/2003 |
| JP | 2003-249965 | 9/2003 |
| JP | 2006-163730 | 6/2006 |
| JP | 2006-352706 | 12/2006 |

* cited by examiner

*Primary Examiner* — Khanh Dang

(74) *Attorney, Agent, or Firm* — Antonelli, Terry, Stout & Kraus, LLP.

(57) ABSTRACT

An interrupt control unit provides controls on an interrupt from an accelerator to a CPU based on a packet transmitted to or received from a controlled object. The interrupt control unit includes: a storage part for storing therein an interrupt control timing table in which a condition of switching a mode of the interrupt control is described; and an interrupt control mode switching part for switching the mode of the interrupt control to the CPU between a permission mode and a mask mode, based on the interrupt control timing table in the storage part.

11 Claims, 15 Drawing Sheets

151 Control table

| No. | Elapsed time | Destination | Communication contents |
|---|---|---|---|
| 1 | 1000 $\mu$s | Node 1 | Position instruction : x=1.2m |
| 2 | 2300 $\mu$s | Node 2 | Speed instruction : v=5cm/s |
| 3 | 3000 $\mu$s | | Estimated completion time of No. 1 |
| 4 | 4250 $\mu$s | Node 3 | Acceleration instruction : $\alpha$=1.1 |
| 5 | 6000 $\mu$s | | Estimated completion time of No. 4 |
| ⋮ | ⋮ | ⋮ | ⋮ |

FIG.7

152 Interrupt control timing table

| No. | Elapsed Time | Interrupt Control Mode | Condition |
|---|---|---|---|
| 1 | 2300 $\mu$s | Permission mode | |
| 2 | 2500 $\mu$s | Mask mode | |
| 3 | 2800 $\mu$s | Permission mode | Reach 95% of No. 1 target value |
| 4 | 3200 $\mu$s | Mask mode | |
| 5 | 6300 $\mu$s | Permission mode | Not reach No. 4 target value |
| ⋮ | ⋮ | ⋮ | ⋮ |

FIG.10A
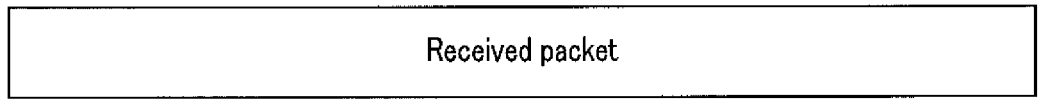
FIG.10B
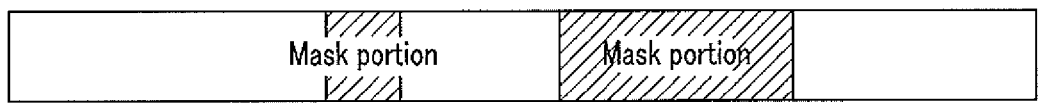
FIG.10C
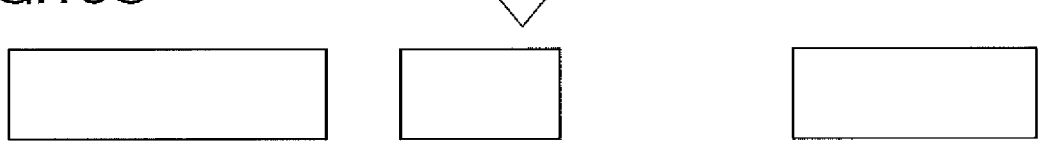
FIG.11
| Specifying Example | Contents |
|---|---|
| 'protocol[14]&2!=0' | Packet in which logical multiply of protocol 14B and 2 is not 0 |
| 'protocol[1:4]' | Protocol 1B to 4B |
| 'protocol[6]&0x80!=0' | Packet in which logical multiply of protocol 6B and 0x80 is not 0 |

Packet

| Telegram 1 | Telegram 2 | Telegram 3 | Telegram 4 | Telegram 5 |

154 Received contents history

| Receipt Time | Property Value |
|---|---|
| 100 μs | 0 |
| 200 μs | 8 |
| 300 μs | 14 |
| 400 μs | 18 |
| 500 μs | 20 |
| ⋮ | ⋮ |

153 Interrupt control mode switching criterion table

| Determination Criterion | Mode |
|---|---|
| Difference value is not less than 8 | Permission mode |
| Derivative value is not more than −2 | Mask mode |
| Value of 10 five consecutive times or more | Mode reversed |

INTERRUPT CONTROL APPARATUS, INTERRUPT CONTROL SYSTEM, INTERRUPT CONTROL METHOD, AND INTERRUPT CONTROL PROGRAM

CROSS REFERENCE TO RELATED APPLICATIONS

This application claims the benefit of Japanese Patent Application No. 2008-239230 filed on Sep. 18, 2008, the disclosure of which is incorporated herein by reference.

BACKGROUND OF THE INVENTION

1. Field of the Invention

The present invention relates to a technique of an interrupt control apparatus, an interrupt control system, an interrupt control method, and an interrupt control program.

2. Description of the Related Art

In some computing systems, hardware of auxiliary type is used for improving a processing capacity of a specific function. Such hardware can substitute for a CPU (Central Processing Unit) in performing a processing for a specific function. Use of the hardware allows the CPU to concentrate its computing resource on other function. Additionally, the hardware is well optimized so as to realize such a specific function. Thus, performance of an overall computing system can be improved. This results in reducing load of an application running on an OS (Operating System) executed by the CPU. Such hardware is generally called an accelerator.

Some accelerators focus on a communication processing. Such an accelerator for communication processing (which may be simply referred to as an accelerator hereinafter) executes a given protocol processing within hardware of its own. Another accelerator for communication processing for use in controlling has a function of transmitting and receiving a communication packet in a prescribed constant period.

The accelerator for communication processing performs a processing coordinating with a CPU and thus has a function of notifying the CPU of an interrupt if a prescribed event occurs. Such an event includes a protocol processing completion, a packet transmission completion, a packet receipt completion, and an occurrence of a failure (for example, a receipt of an abnormal packet).

Upon notification of an interrupt, the CPU obtains necessary information from the accelerator for communication processing and executes a prescribed processing. The CPU may set prescribed information at the accelerator for communication processing. Such a prescribed processing includes a received packet acquisition, a transmitting packet setting, an instruction value setting, and an acquisition of a communication processing result. The processing is executed as an interrupt handler in an OS. In some cases, an interrupt handler runs a specific application. In other cases, after a minimum required processing is carried out in an interrupt handler, the interrupt handler makes another interrupt handler start with a delay.

If a computer having an accelerator for communication processing concurrently controls a plurality of controlled objects, a period for the control is a period of a controlled object having the shortest control period among the plurality of controlled objects or a period corresponding to the largest common factor of control periods of the plurality of controlled objects. A system with a plurality of controlled objects thus has a tendency to have a shorter communication period and a faster transmission and receipt of a communication.

Herein, a problem occurs in transmitting and receiving a control packet in a fast period such as a motion control or a servomotor control, using an accelerator for communication processing. If a communication period of a communication packet is faster compared with performance of a CPU on which an OS operates, interrupts on the OS occur frequently, which prevents the OS from performing a processing other than the interrupt control processing.

Published Japanese translation of PCT international publication for patent application, Publication No. 2003-524312 (to be referred to as JP 2003-524312A hereinafter) discloses a method and an apparatus of presenting an interrupt in a network interface in which an interrupt is generated in response to a transfer of a packet only if a prescribed period of time has elapsed or a prescribed number of packets have been transferred since a previous interrupt was processed. According to a technique described in JP 2003-524312A, generation of an interrupt handler can be prevented, and overhead cost of communications can be reduced in a general-purpose communication processing in which priority is given to a throughput.

Japanese Laid-Open Patent Application, Publication No. 2006-163730 (to be referred to as JP 2006-163730A hereinafter) discloses an interrupt control method of suspending an interrupt processing, and a controller using the method if a prescribed processing time has elapsed in a prescribed period. According to a technique of JP 2006-163730A, running time of an application is ensured.

However, the technique described in JP 2003-524312A is not applied to a communication in a fast period which is accompanied by a control or other operation. Therefore, the technique of JP 2003-524312A may result in preventing generation of a packet regarding a control computing having a time constraint. If a control computing is executed after a prescribed period of time has elapsed or after a prescribed number of packets are transmitted or received, performance of controlling is decreased without meeting the time constraint. That is, in the technique of JP 2003-524312A, an interrupt is blocked from when a previous interrupt was generated until when a prescribed time has elapsed or a prescribed number of packets have been transferred. If a processing has a time constraint, a time required for the processing may have elapsed before the above-mentioned period of time for blocking an interrupt terminates.

According to the technique described in JP 2006-163730A, a processing of a packet regarding a control computing having a time constraint is delayed, and performance of controlling is decreased. That is, if a communication control is required to be performed within a short period of time, there is a possibility that the above-mentioned period of preventing an interrupt delays the entire processing.

The present invention has been made in light of the background and in an attempt to realize an efficient interrupt in a communication in a fast period requiring an interrupt.

SUMMARY OF THE INVENTION

An interrupt control apparatus for providing controls on an interrupt from an accelerator for communication processing to a CPU, based on a signal transmitted to or received from outside includes: a storage part for storing therein switching condition information in which a condition of switching a mode of the interrupt control is described; a transmission/reception part for transmitting and receiving the signal; and an interrupt control mode switching part for switching the mode of the interrupt control to the CPU, based on the transmitted and received signal and the switching condition information in the storage part.

Other features and advantages of the present invention will become more apparent from the following detailed description of the invention, when taken in conjunction with the accompanying exemplary drawings.

BRIEF DESCRIPTION OF THE DRAWINGS

FIG. 7 is a diagram illustrating an example of an interrupt control timing table according to the first embodiment

FIGS. 10A to 10C are schematic diagrams sequentially illustrating a method of specifying a portion to be extracted using a logical multiply with each bit of a packet and a mask string according to the second embodiment. FIG. 10A shows a packet received from a controlled object. FIG. 10B shows the packet with mask portions. FIG. 10C shows the packet with extracted portions which is obtained by removing the mask portions.

FIG. 11 is a table showing a method of specifying an extracted part by specifying a bit string in a prescribed data item of a protocol according to the second embodiment.

DETAILED DESCRIPTION OF THE EXEMPLARY EMBODIMENT

Exemplary embodiments of the present invention are described below in detail with reference to the related drawings according to the necessity. In the embodiments, an accelerator means an accelerator for communication processing.

First Embodiment

Figure 1:
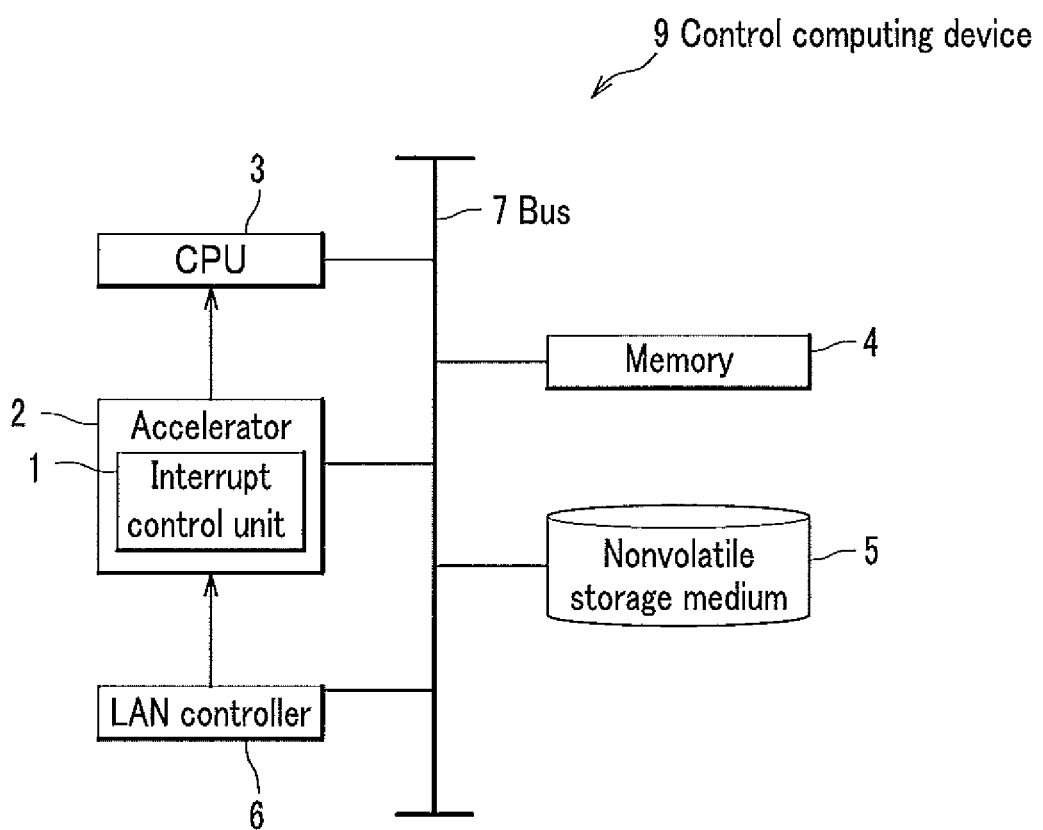
FIG. 1 is a diagram illustrating an example of a hardware configuration of a control computing device according to a first embodiment.

Next is described a first embodiment of the present invention with reference to FIG. 1 through FIG. 8.
<Hardware Configuration>
FIG. 1 is a diagram illustrating an example of a hardware configuration of a control computing device according to the first embodiment.

A control computing device 9 (which may also be referred to as an information processing device) includes a CPU 3, an accelerator 2, a memory 4, a LAN (Local Area Network) controller 6, a memory 4, and a nonvolatile storage medium 5, all of which are connected to each other via a bus 7.

The accelerator 2 communicates to a control network 92 (see FIG. 2 and FIG. 3) periodically in accordance with a period or contents of a communication set at a control application 42 to be described later with reference to FIG. 4. The accelerator 2 includes an interrupt control unit 1 (which may also be referred to as an interrupt control apparatus). The interrupt control unit 1 controls an interrupt by notifying the CPU 3 of an interrupt issued at the accelerator 2 or masking the notification of the interrupt. In this embodiment, the accelerator 2 also notifies the interrupt control unit 1 of various interrupts such as a transmission completion and a receipt completion of a control packet (a signal, which may be simply referred to as a packet).

The CPU 3 develops a program from the nonvolatile storage medium 5 in the memory 4 and executes the program. The program executed herein may be an OS including an interrupt handler, and an application program running on an OS.

Figure 2:
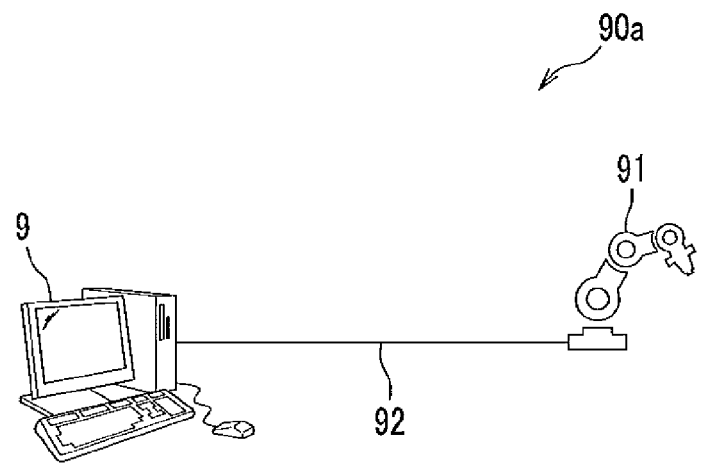
FIG. 2 is a diagram illustrating an example of a control system configured using the control computing device according to the first embodiment.
Figure 3:
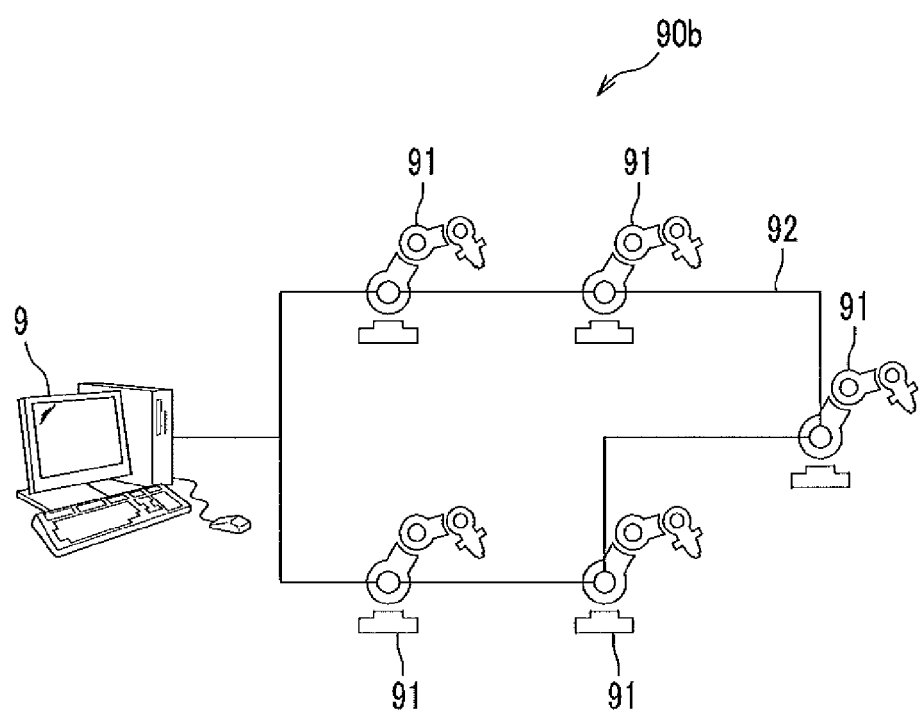
FIG. 3 is a diagram illustrating another example of the control system configured using the control computing device according to the first embodiment.

The LAN controller 6 is embodied by a transmitter/receiver IC (Integrated Circuit) in which a function of communicating to the control network 92 to be described later with reference to FIG. 2 and FIG. 3 is implemented. The control network 92 may be the Ethernet (registered trademark), and a LAN using the Ethernets (registered trademark) for various industrial use which are discussed and compiled as the IEC (International Electrotechnical Commission) 61784-2 as international standards.

The memory 4 is a temporary storage area and stores therein an OS transferred from the nonvolatile storage medium 5, an application program, and the like.

The nonvolatile storage medium 5 is an information storage medium and is embodied by a flash memory or a HD (Hard Disk). The nonvolatile storage medium 5 is used for storing a program executed by the CPU 3 or a result of the program execution.

The bus 7 may be a PCI (Peripheral Component Interconnect) bus, an ISA (Industry Standard Architecture) bus, a PCI Express bus, a system bus, a memory bus, or the like. The CPU 3, memory 4, nonvolatile storage medium 5, accelerator 2, and LAN controller 6 may have any connection configuration. However, advantages of this embodiment remain unchanged as long as a connection configuration used has a relationship of notifying an interrupt similar to the relationship in the interrupt control unit 1, CPU 3, and accelerator 2.

FIG. 2 and FIG. 3 are diagrams each illustrating an example of a control system configured using the control computing device according to this embodiment.

In both control systems 90a, 90b, the control computing device 9 is connected to a controlled object 91 via the control network 92 and controls the controlled object 91 by transmitting and receiving a packet to and from the controlled object 91. The controlled object 91 may be configured by, for example, a servo amplifier and a servomotor. Note that, in the control system 90a of FIG. 2, the control computing device 9 is connected to one controlled object 91, and, in the control system 90b of FIG. 3, to a plurality of the controlled objects 91 in a ring topology form. Advantages of this embodiment remain unchanged even if the logical ring topology is substituted by a star topology or the like.

Figure 4:
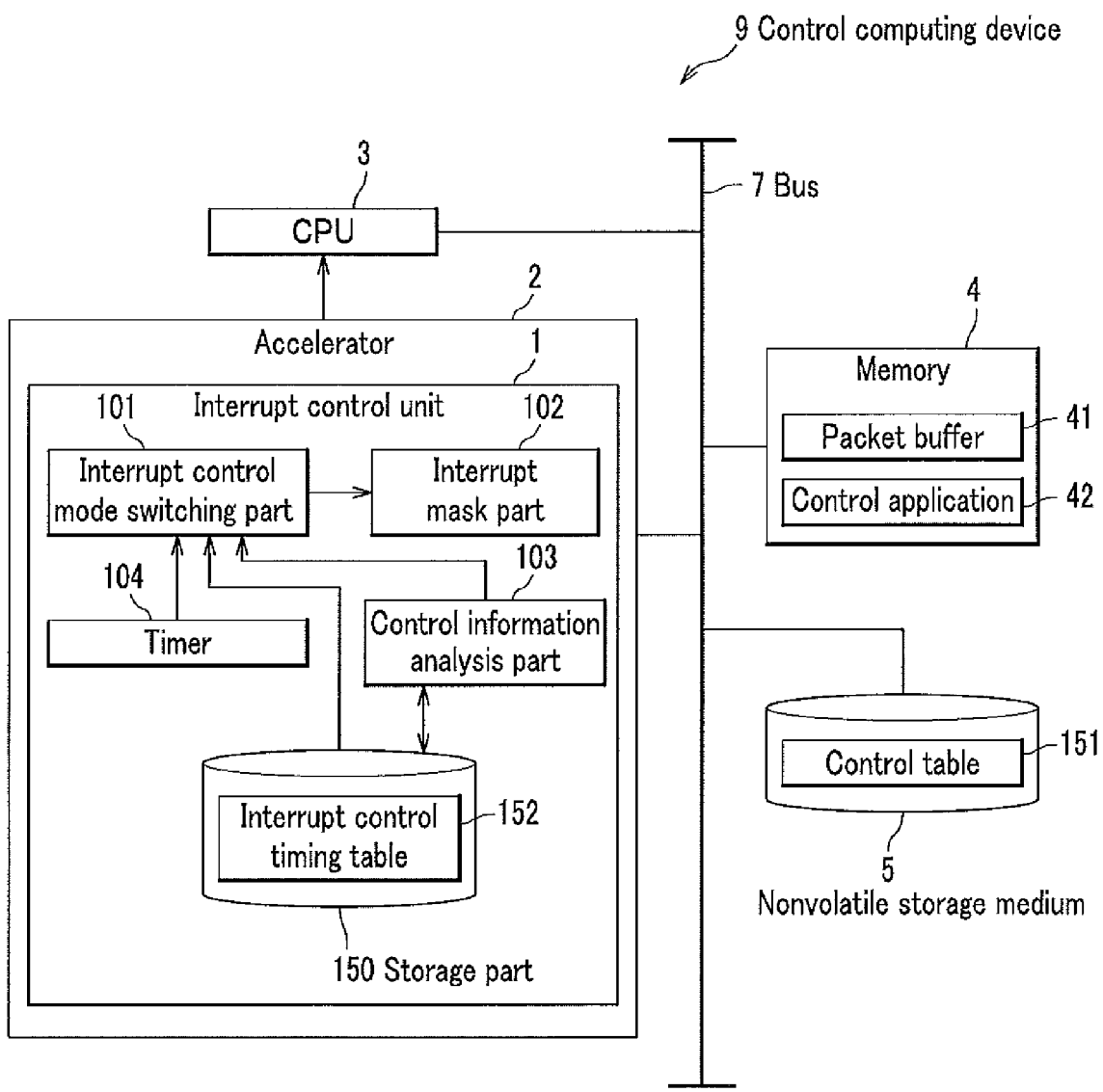
FIG. 4 is a block diagram illustrating a detailed configuration of the control computing device according to the first embodiment.

FIG. 4 is a block diagram illustrating a detailed configuration of a control computing device according to the first embodiment. In FIG. 4, the same reference numbers are used for the components substantially the same as those shown in FIG. 1, and description thereof is omitted herefrom.

The interrupt control unit 1 included in the accelerator 2 includes an interrupt mask part 102, an interrupt control mode switching part 101, a control information analysis part 103, a timer 104, and a storage part 150. In FIG. 4, the LAN controller 6 (see FIG. 1) is not shown. Note that the interrupt control unit 1 in this embodiment as well as in other embodiments to be described later has a transmission/reception part, not shown, for transmitting and receiving information to and from the LAN controller 6 and the CPU 3. The transmission/reception part may be embodied by a communication function of the accelerator 2.

The interrupt mask part 102 notifies of an interrupt from the accelerator 2 to the CPU 3 or masks the notification, under instructions from the interrupt control mode switching part 101. The mask used herein means blocking an interrupt notification (which may be simply referred to as an interrupt) from the accelerator 2 to the CPU 3.

The interrupt control mode switching part 101 makes the interrupt mask part 102 switch a response to the interrupt from the accelerator 2 to the CPU 3, based on a prescribed determination criterion. The prescribed determination criterion is a condition described in an interrupt control timing table 152 (which may also be referred to as switching condition information) to be described later with reference to FIG. 7.

The control information analysis part 103 receives control information from a control application 42 to be described later. Based on the control information, the control information analysis part 103 creates an interrupt control timing table 152. The interrupt control timing table 152 describes a condition of notifying the CPU 3 of an interrupt from the accelerator 2 after the control application 42 is executed.

The timer 104 keeps time and provides time information to the interrupt control mode switching part 101 of the interrupt control unit 1. The time information is used for time keeping of an elapsed time after the control application 42 is executed, or for recording time when various events occur. The timer 104 may not be included in the interrupt control unit 1 and may be substituted by a timer device disposed outside of the interrupt control unit 1.

The storage part 150 stores therein the interrupt control timing table 152 in which a condition of switching an interrupt control mode is described. A control table 151 will be described later with reference to FIG. 6. The interrupt control timing table 152 will also be described later with reference to FIG. 7.

The memory 4 stores therein the control application 42, a packet buffer 41, or the like.

The control application 42 is an application for performing a communication control processing.

The packet buffer 41 is an area in the memory 4 for holding contents of a communication packet transmitted to or received from the control networks 92a, 92b (see FIG. 2 and FIG. 3) via the LAN controller 6 or contents corresponding thereto. The packet buffer 41 may be included in the interrupt control unit 1 or the accelerator 2.

The nonvolatile storage medium 5 stores therein the control table 151 in which a timing and a destination of transmitting a control signal to the controlled object 91 (see FIG. 2 and FIG. 3) are described. The control table 151 is to be explained later with reference to FIG. 6.

<Mode Switching Model>

Figures 5, 6:
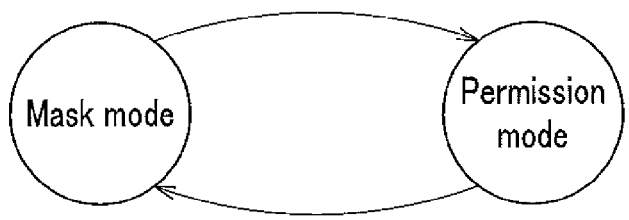
FIG. 5 is a diagram illustrating a mode switching according to the first embodiment.
FIG. 6 is a diagram illustrating an example of a control table according to the first embodiment.

FIG. 5 shows a mode switching according to this embodiment.

In this embodiment, a control mode of an interrupt (which may also be referred to as an interrupt control mode) from the accelerator 2 to the CPU 3 includes a mask mode and a permission mode.

In the permission mode, the interrupt control unit 1 is set to notify an interrupt to the CPU 3. In the mask mode, the interrupt control unit 1 is set to mask a notification of the interrupt to the CPU 3. The interrupt control mode switching part 101 conducts the mode switching between the permission mode and the mask mode according to the interrupt control timing table 152 shown in FIG. 7.

<Control Table>

FIG. 6 shows an example of a control table according to this embodiment.

The control table 151 includes information in which a timing and a destination of transmitting a control packet (to be simply referred to as a packet hereinafter) by the control application 42 to the controlled object 91 (see FIG. 2 and FIG. 3) are described.

The control table 151 of FIG. 6 includes a number (No.) indicating an order of control, an elapsed time from a start time of the control application 42, an identifier of a destination, and communication contents contained in a packet.

The communication contents include an instruction value to the controlled object 91 (see FIG. 2 and FIG. 3). The control table 151 of FIG. 6 stores therein one or more instruction values among a position instruction, a speed instruction, and an acceleration instruction. For example, Instruction No. 1 of FIG. 6 has contents instructing that Node 1 takes a position of 1.2 m after 1000 μs elapses from the time of starting the control application 42 (see FIG. 4).

Instruction No. 3 has contents indicating that a processing of Instruction No. 1 is estimated to be completed after 3000 μs elapses from the execution start time of the control application 42. That is, Instruction No. 3 indicates that an acknowledgement packet acknowledging the completion of the processing of Instruction No. 1 is to be received from Node 1 after 3000 μs elapses from the execution start time of the control application 42.

<Interrupt Control Timing Table>

FIG. 7 is an example of the interrupt control timing table 152 created based on the control table 151 of FIG. 6 according to the first embodiment.

As shown in FIG. 7, the interrupt control timing table 152 includes: a number indicating an order of switching the interrupt control mode; a timing of switching the interrupt control mode planned by the control information analysis part 103 (see FIG. 4); the interrupt control mode at the switching; and a condition of switching the interrupt control mode.

For example, No. 1 of FIG. 7 indicates that the interrupt control mode is set to the permission mode at the elapsed time of 2300 μs (corresponding to a time of transmitting a speed instruction in No. 2 of FIG. 6).

Further, No. 3 of FIG. 7 indicates that the interrupt control mode is set to the permission mode if a measured value reaches 95% of a target instruction value at the elapsed time of 2800 μs. The interrupt control mode may be thus switched if a measured value approaches a prescribed threshold value relative to a target value described in the control table 151 (see FIG. 6). Such a prescribed threshold value may be, for example, a difference between an actual value and a target value which is within a certain percentage of the target value.

If both the elapsed time and the switching condition are described, the interrupt control mode may be switched upon satisfaction of either one or the both.

Another example of switching the interrupt control mode is that the interrupt control mode switching part 101 (see FIG. 4) references the interrupt control timing table 152; determines, if an actual value does not reach a target value even when a prescribed period of time has elapsed after a planned estimated time of reaching the target value, that there is a failure; and switches the interrupt control mode such that an interrupt is notified to the CPU 3 (that is, to the permission mode).

No. 5 of FIG. 7 indicates that the interrupt control mode is to be switched to the permission mode, if an actual value does not reach a target value of No. 4 of FIG. 6 (namely, an acceleration instruction value at is 1.1) even when a 5% of an estimated time of reaching a target value has elapsed (6300 μs) after the estimated reaching time. That is, if a difference between an actual acceleration and a target value of the acceleration ($\alpha=1.1$) reaches the target value or a prescribed time has elapsed after the reaching, the interrupt control mode is switched to the mask mode, thus masking an interrupt from the accelerator 2 to the CPU 3.

The interrupt control mode switching part 101 may notify the control application 42 executed by the CPU 3 by means of a register or the like that the interrupt occurs because there is a failure in the system. Upon receiving the interrupt, the control application 42 may transmit a stop instruction to the controlled object 91, notify an upper server of the failure occurrence, or make a monitor or other display device connected to the control computing device 9 (see FIG. 1 and FIG. 4) display the failure occurrence.

The interrupt control timing table 152 may use the information of the control table 151 transmitted from the nonvolatile storage medium 5 as it is without processing.

<Flowchart>

Figure 8:
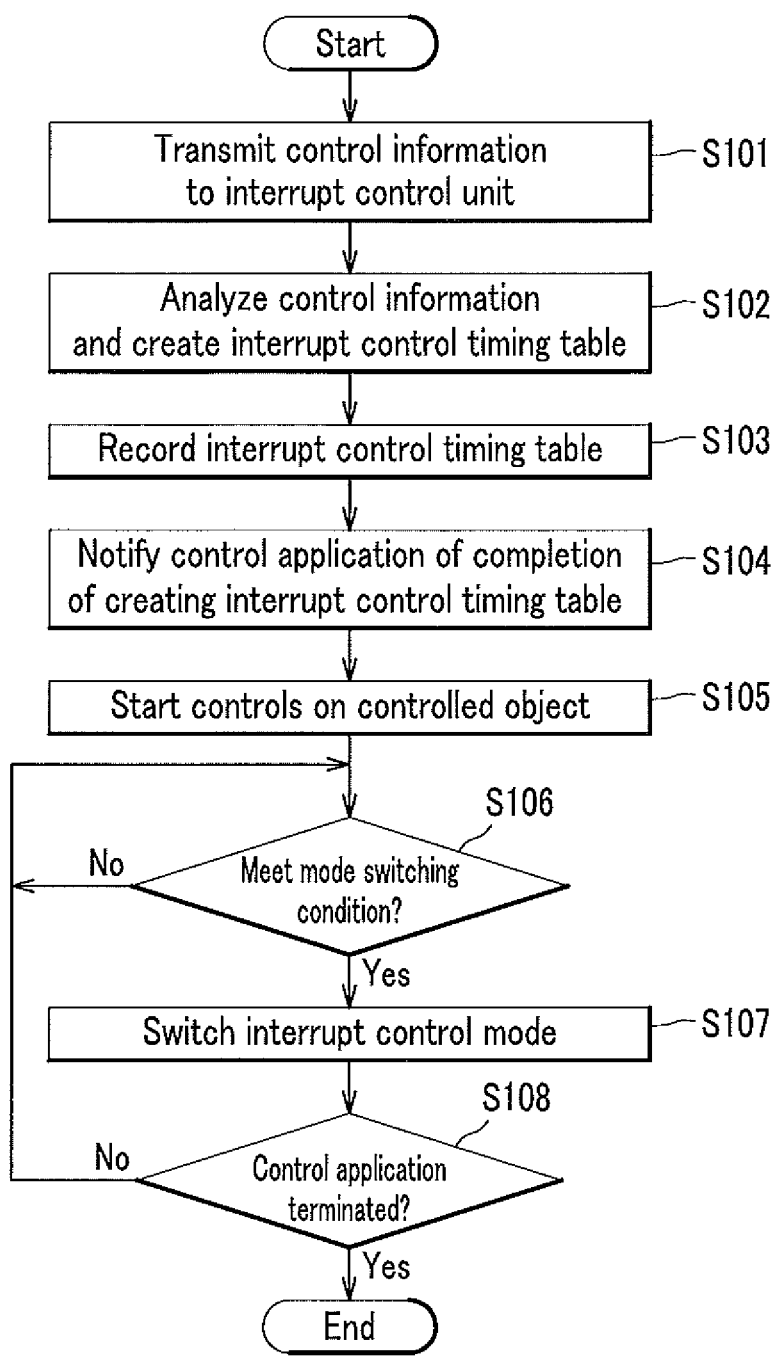
FIG. 8 is a flowchart illustrating a flow of an interrupt control processing according to the first embodiment.

Next is described a flow of an interrupt control processing according to the first embodiment with reference to FIG. 8 as well as FIG. 1 to FIG. 7 where necessary.

FIG. 8 is a flowchart illustrating a flow of an interrupt control processing according to the first embodiment.

The control application 42 on an OS to be executed by the CPU 3 transmits control information which is information on the control table 151 to the interrupt control unit 1 according to a prescribed format before the OS execution (S101).

The control information analysis part 103 analyzes contents of the received control information; creates the interrupt control timing table 152, based on the analyzed contents (S102); and plans an appropriate timing of an interrupt from the accelerator 2 after a start-up of the control application 42.

As described above, the interrupt control timing table 152 may use the transmitted information of the control table 151 as it is without processing in determining a timing of switching the interrupt control mode. Or, the control information analysis part 103 may switch the interrupt control mode to the permission mode if a target value described in the control table 151 approaches a prescribed threshold. Such a threshold may be, for example a prescribed difference between a current value included in a received packet and a target value which is within a certain percentage of the target value. Further, if a current value does not reach a target value even when a prescribed period of time has elapsed after the estimated reaching time, it is determined that there is a failure, and the interrupt control mode is set to be switched such that an interrupt is notified to the CPU 3 (that is, to the permission mode). The interrupt control unit 1 may be set to notify the control application 42 of the CPU 3 by means of a register or the like that the interrupt is not normal. Upon receiving the interrupt, the control application 42 may transmit a stop instruction to the controlled object 91, notify an upper server of the failure occurrence, or make a monitor or other display device connected to the control computing device 9 display the failure occurrence.

The control information analysis part 103 records the planned interrupt control switching conditions in the interrupt control timing table 152 (S103).

After recording the conditions in the interrupt control timing table 152 in S103, the control information analysis part 103 notifies the control application 42 that the interrupt control timing table 152 has already been created (S104). The notification may be made by an interrupt, a message transmission on the bus 7, or the like.

Upon receiving the notification that the interrupt control timing table 152 has already been created, the control application 42 starts a packet transmission/reception to/from the controlled object 91 according to the control table 151, thus starting controls on the controlled object 91 (S105). The control application 42 then notifies the interrupt control unit 1 that the controls on the controlled object 91 have already been started and instructs the accelerator 2 to perform a communication processing of a packet.

The accelerator 2 continues operate in the shortest required communication period among execution periods of the control application 42. In the meantime, the accelerator 2 generates an interrupt an interrupt to the interrupt control unit 1 in the above-mentioned period. The control information analysis part 103 references the interrupt control timing table 152, while keeping on being informed of the interrupt from the accelerator 2 in the above-mentioned period; determines whether or not communication contents of a packet received by the accelerator 2 meet the mode switching condition of the interrupt control mode (S106); and notifies the interrupt control mode switching part 101 of results of the determination.

After S106, if the communication contents are not determined to meet the mode switching condition (if No in S106), the interrupt control unit 1 returns the processing to S106.

Following S106, if the communication contents are determined to meet the mode switching condition (if Yes in S106), the interrupt control mode switching part 101 switches the interrupt control mode to an appropriate mode according to the interrupt control timing table 152 (S107). The interrupt mask part 102 controls an interrupt from the accelerator 2 to the CPU 3 according to the switched interrupt control mode.

Note that, if the interrupt control mode after the switching is the same as before, the interrupt control mode switching part 101 naturally needs not switch the interrupt control mode in S107.

The interrupt control unit 1 then determines whether or not the control application 42 has been terminated (S108).

Following S108, if the control application 42 is not determined to have been terminated (if No in S108), the interrupt control unit 1 returns the processing to S106.

Following S108, if the control application 42 is determined to have been terminated (if Yes in S108), the interrupt control unit 1 terminates the processing.

The determination whether or not the control application 42 has been terminated in S108 may be made by determining whether or not the interrupt control unit 1 receives a notification of termination from the control application 42.

The determination in S108 may be made by determining whether or not the interrupt control unit 1 notifies that the last record of the interrupt control timing table 152 has been processed. The notification may be made by issuing a notification of processing termination from the interrupt control unit 1 to the control application 42 using an interrupt. As just described, if the interrupt control unit 1 notifies the control application 42 that the last record of the interrupt control timing table 152 has been processed, that is, the last timing, the control application 42 can confirm whether or not there is a gap between a control execution period of its own and an execution period of the interrupt control timing table 152 of the interrupt control unit 1. For example, assume that, due to some failure, communication contents written in the last record of the interrupt control timing table 152 is notified to the control application 42 even though the control application 42 keeps on an execution operation. To handle this, the control application 42, for example, transmits control information for re-creating the interrupt control timing table 152 to the interrupt control unit 1, and the control information analysis part 103 re-creates the interrupt control timing table 152 based on the transmitted control information.

If an amount of information obtained from the control table 151 is as large as to exceed a capacity of the interrupt control timing table 152, the control information analysis part 103 obtains only information as much as accumulable in the interrupt control timing table 152 from the control application 42 and stores the information in the interrupt control timing table 152 in S101. At this time, the control information analysis part 103 saves one entry (one record) in the interrupt control timing table 152. After execution of the control application 42, the control information analysis part 103 writes, in the interrupt control timing table 152, an entry at a timing earlier by a time required for the plan made by the control information analysis part 103 from the last record having been previously accumulated in the interrupt control timing table 152. That is, the control information analysis part 103 updates the interrupt control timing table 152 in a new-in old-out manner. Further, the interrupt control unit 1 notifies the CPU 3 (control application 42) of the update of the interrupt control timing table 152. The notification may made in a way in which: a given parameter in a given register is defined to indicate that the interrupt control timing table 152 requires an update; and the CPU 3 (control application 42) which has received an interrupt (or a notification) from the interrupt control unit 1 checks the register to determine whether or not the interrupt control timing table 152 requires the update. If the CPU 3 (control application 42) determines that the interrupt control timing table 152 requires the update, the CPU 3 transmits a necessary portion of the control table 151 to the interrupt control unit 1.

Advantageous Effects of First Embodiment

In the first embodiment, the interrupt control unit 1 can mask an unnecessary interrupt notification to the CPU 3 depending on contents of a packet, while transmitting and receiving packets to and from the accelerator 2 in a fast period. That is, the interrupt control unit 1 can make a notification of an interrupt to the CPU 3 (an OS) at a timing only necessary for the control application 42. Therefore, the OS executed by the CPU 3 will not execute an unnecessary interrupt processing, thus allowing the OS to concentrate on executing other applications. The execution of other applications includes, for example, a monitor or a diagnosis of the controlled object 91 and a communication of operational information to an upper management server.

Second Embodiment

Next is described a second embodiment of the present invention with reference to FIG. 9 to FIG. 15. No that, in the first embodiment, the interrupt control unit 1 for an interrupt control of FIG. 1 switches the interrupt control mode according to a pre-set timing (the interrupt control timing table 152). In the second embodiment, however, an interrupt control unit 1a switches the interrupt control mode, comparing contents of a previously-received packet.

<System Configuration>

Figure 9:
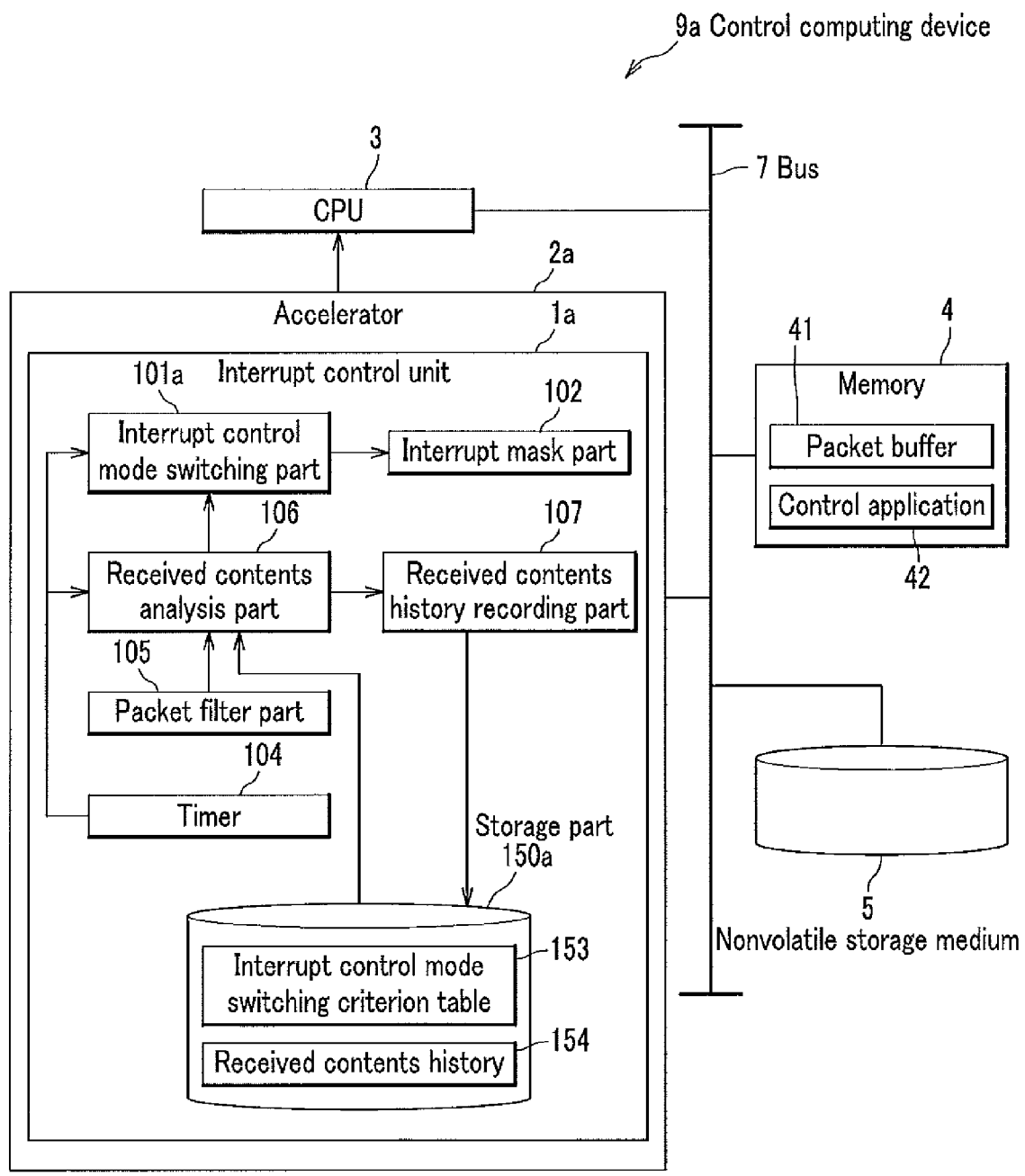
FIG. 9 is an example of a configuration of a control computing device according to a second embodiment.

FIG. 9 is an example of a configuration of a control computing device according to the second embodiment. In FIG. 9, same reference numerals are used for the components having substantially the same functions as those of FIG. 4, and description thereof is omitted herefrom.

The interrupt control unit 1a of a control computing device 9a includes an interrupt control mode switching part 101a, the interrupt mask part 102, the received contents analysis part 106, the received contents history recording part 107, the packet filter part 105, and the timer 104.

The packet filter part 105 (which may also be referred to as a transmission/reception part) extracts a portion to be analyzed or recorded, from a received packet. A method of specifying a portion to be extracted of a packet is described later with reference to FIG. 10 to FIG. 12.

The received contents history recording part 107 stores contents of a received packet extracted by the packet filter part 105, in a received contents history 154 of the storage part 150a in chronological order. If the received contents history recording part 107 receives too many packets to record therein, the received contents history recording part 107 deletes, for example, information on a packet beginning with the oldest packet and records therein information on a new packet. In this case, a data structure of the received contents history 154 may be First-in First-out, cue, ring buffer, or the like.

The received contents analysis part 106 analyzes contents of a received packet such as calculation of a difference value or a derivative value of a property value to be described later, based on the contents of a received packet extracted by the packet filter part 105 and chronological information recorded in the received contents history 154. The received contents analysis part 106 also makes various settings based on information inputted from an input unit not shown.

The interrupt control mode switching part 101a can make the interrupt mask part 102 switch a response to an interrupt from the accelerator 2a to the CPU 3 (control application 42), according to an output from the received contents analysis part 106.

The storage part 150a includes an interrupt control mode switching criterion table 153 (which may also be referred to as switching condition information) and a received contents history 154.

The interrupt control mode switching criterion table 153 records therein: a determination criterion according to which the interrupt control mode switching part 101a switches the interrupt control mode; and to which mode the interrupt control mode is switched. The determination criterion for switching the interrupt control mode (a switching criterion) includes, for example, that a difference between a property value in contents of a received packet and that of a previously-received contents is not less than a prescribed value, or that a variation previously evaluated a prescribed number of times is not less than a prescribed value. In those cases, an interrupt is notified to the CPU 3 (control application 42) (that is, to the permission mode).

In FIG. 9, a control table stored in the nonvolatile storage medium 5 is not shown.

The received contents history 154 stores herein information on contents of a received packet in chronological order. In this embodiment, the received contents history 154 is included in the storage part 150a but may be included in the nonvolatile storage medium 5.

<Method of Extracting Packet>

Next is described a method of specifying a portion to be extracted from a packet with reference to FIG. 10A to FIG. 12.

FIGS. 10A to 10C are schematic diagrams illustrating a method of specifying a portion to be extracted using a logical multiply with each bit of a packet and a mask string. FIG. 10A shows a packet received from a controlled object. FIG. 10B shows a mask portion in the packet. FIG. 10C shows an extracted portion which is obtained by removing the mask portion from the packet.

The packet filter part 105 receives a packet as shown in FIG. 10A. The packet includes a mask portion as shown in FIG. 10B. The mask portion herein stores information irrelevant to analysis of the packet. The packet filter part 105 removes the mask portion to obtain portion to be extracted as shown in FIG. 10C.

FIG. 11 is a table showing a method of specifying a portion to be extracted by specifying a bit string in a prescribed data item of a protocol.

The packet filter part 105 selects and obtains a target packet or a target position in a packet according to pre-set extraction rules as shown in a column of "Specifying Example" of FIG. 11. More specifically, an example of "Specifying Example" shown in FIG. 11 includes a method of setting a filter condition in a commonly-used network check tool, "tcpdump", of a UNIX (registered trademark) OS. Respective meanings of the Specifying Examples are described in "Contents".

Figures 12, 13, 14:
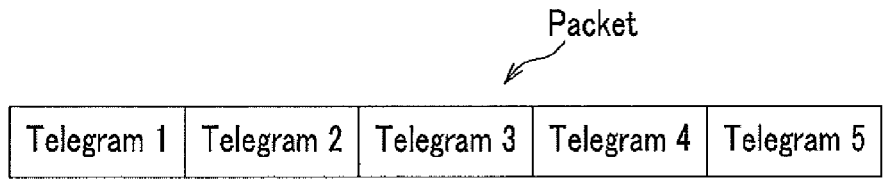
FIG. 12 is a diagram illustrating an example of a packet configured by a plurality of telegrams according to the second embodiment.
FIG. 13 is a diagram illustrating an example of a received contents history according to the second embodiment.
FIG. 14 is a diagram illustrating an example of an interrupt control mode switching criterion table according to the second embodiment.

FIG. 12 is a diagram illustrating an example of a packet configured by a plurality of telegrams.

If a packet is configured by a plurality of telegrams as shown in FIG. 12, the packet filter part 105 obtains a portion to be extracted (a telegram) in the packet by specifying a given telegram. The packet filter part 105 may narrow the obtained telegram down to a position to be extracted, using the method shown in FIG. 10 or FIG. 11. The method of specifying a telegram of FIG. 12 may include a method of using an identifier distinguishable from other telegrams such as an ID number in the telegram and a type of instruction.

<Received Contents History>

FIG. 13 is a diagram illustrating an example of a received contents history according to the second embodiment.

In FIG. 13, a value (property value) received at a receipt time of 100 μs is "0"; at 200 μs, "8"; at 300 μs, "14"; at 400 μs, "18"; and at 500 μs, "20". The property value includes, for example, positional information, temperature, illuminance, humidity, speed, acceleration, electric current value, power value, atmospheric pressure, and sound volume of the controlled object 91.

The received contents history 154 includes contents of a received packet in chronological order.

In FIG. 13, the control table stored in the nonvolatile storage medium 5 is not shown.

<Interrupt Control Mode Switching Criterion Table>

FIG. 14 is a diagram illustrating an example of an interrupt control mode switching criterion table according to the second embodiment.

The interrupt control mode switching criterion table 153 includes "Determination Criterion" and "Mode". "Mode" used herein is the interrupt control mode.

FIG. 14 indicates that, if the determination criterion is that "a difference value is not less than 8", the interrupt control mode is switched to the permission mode. If a "derivative value is not more than −2", the interrupt control mode is switched to the mask mode. If "a (property) value of 10 comes out five consecutive times or more", the interrupt control mode is reversed. The difference value used herein means a difference between two property values shown in FIG. 13. For example, the difference value between the property values at the receipt times of 100 μs and 200 μs in FIG. 13 is 8. Similarly, at the receipt times of 200 μs and 300 μs is 6; and, at 300 μs and 400 μs, 4; and at 400 μs and 500 μs, 12.

The derivative value used herein means a difference value obtained from two difference values. For example, a derivative value between 100 μs and 300 μs is calculated by the expression: 6-8=−2/100 μs. Similarly, a derivative value between 200 μs and 400 μs is calculated by the expression: 4-6=−2/100 μs.

<Flowchart>

Figure 15:
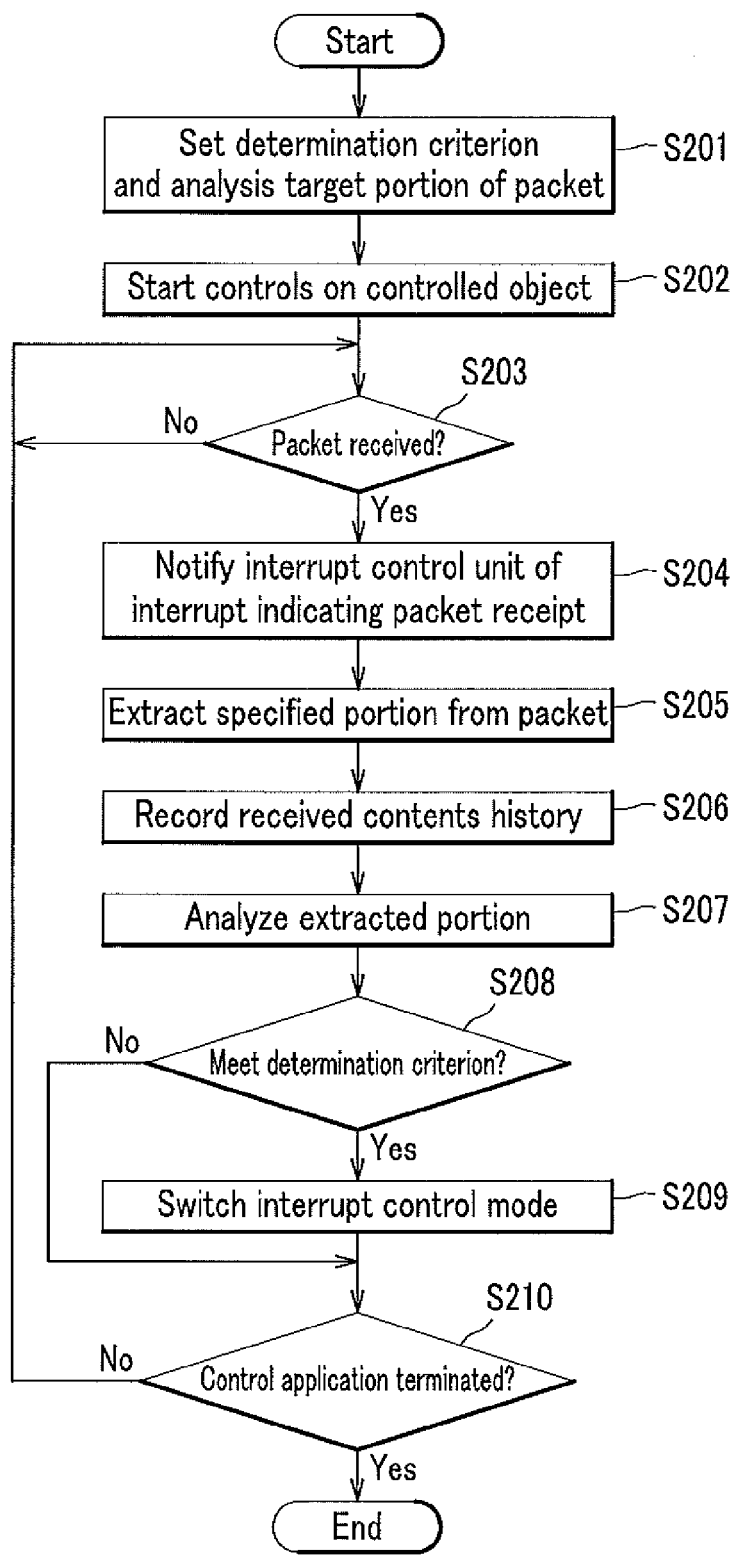
FIG. 15 is a flowchart illustrating a flow of an interrupt control processing according to the second embodiment.

Next is described a flow of an interrupt control processing according to the second embodiment with reference to FIG. 15 as well as FIG. 9, FIG. 13, and FIG. 14 where necessary.

FIG. 15 is a flowchart illustrating the interrupt control processing according to the second embodiment.

The received contents analysis part 106 sets: a determination criterion used for determining an interrupt control mode switching, such as a threshold of a difference value and a threshold of a derivative value; and an analysis target portion of a packet for indicating which portion of the packet is to be analyzed and recorded (S201). The received contents analysis part 106 writes the set determination criterion and an interrupt control mode used when the determination criterion is satisfied, which are made to be paired with each other, in the interrupt control mode switching criterion table 153. The received contents analysis part 106 sets the set analysis target portion of the packet in the packet filter part 105. The setting in S201 may be carried out by inputting contents to be set by a user via an input unit not shown or by sending a message from a program operating on the CPU 3 via the bus 7.

After completion of the setting in S201, the received contents analysis part 106 notifies the control application 42 that the setting of the determination criterion and the analysis target portion of the packet has been accomplished. The control application 42 then starts controls on the controlled object 91 according to the control table 151 (see FIG. 4) (S202).

After the control application 42 starts the controls, the accelerator 2a determines whether or not a packet has been received (S203).

Following S203, if a packet is not determined to have been received (if No in S203), the accelerator 2a returns the processing to S203.

Following S203, if a packet is determined to have been received (if Yes in S203), the accelerator 2a stores the received packet in the packet buffer 41 and notifies the interrupt control unit 1a of an interrupt indicating that the packet has been received (S204).

The packet filter part 105 of the interrupt control unit 1a having received the interrupt extracts a specified portion from the received packet stored in the packet buffer 41 according to the analysis target portion set in S201 (S205).

The received contents history recording part 107 records contents described in the extracted portion (that is, the property value), in the received contents history 154 (S206).

The received contents analysis part 106 references the received contents history 154 to analyze the extracted portion of the packet (S207) and notifies the interrupt control mode switching part 101*a* of results of the analysis. More specifically, the received contents analysis part 106 references the received contents history 154 to calculate a difference value or a derivative value of the property value or count a specific value which comes out consecutively.

The interrupt control mode switching part 101*a* compares the results of analysis made by the received contents analysis part 106 with the interrupt control mode switching criterion table 153 and determines whether or not the analysis result meets the determination criterion of the interrupt control mode switching criterion table 153 (S208). For example, in the interrupt control mode switching criterion table 153 of FIG. 14, a determination is made whether or not the difference value of the property value is not less than 8; the derivative value is not more than −2; or the property value of 10 comes out five consecutive times or more.

Following S208, if the analysis result is not determined to meet the determination criterion (if No in S208), the interrupt control unit 1*a* advances the processing to S210.

Following S208, if the analysis result is determined to meet the determination criterion (if Yes in S208), the interrupt control mode switching part 101*a* switches the interrupt control mode of the interrupt mask part 102 to an appropriate mode according to the interrupt control mode switching criterion table 153 (S209).

The interrupt control unit 1*a* determines whether or not the control application 42 has been terminated (S210).

Following S210, if the control application 42 is not determined to have been terminated (if No in S210), the accelerator 2*a* returns the processing to S203.

Following S210, if the control application 42 is determined to have been terminated (if Yes in S210), the interrupt control unit 1*a* terminates the processing. Step S210 is same as that in the first embodiment, and description thereof is omitted herefrom.

Advantageous Effects of Second Embodiment

In the second embodiment, the interrupt control unit 1*a* can control an interrupt to the CPU 3 according to a condition of the controlled object 91, while transmitting and receiving packets to and from the accelerator 2*a* in a fast period. For example, if a (property) value read by a sensor shows little change compared to a previously-read value and it is thus not necessary to change an instruction value from the controlled object 91, the interrupt control unit 1*a* masks an interrupt to the CPU 3. Meanwhile, if a difference between a currently-read value and a previous value is larger than a prescribed value, the interrupt control unit 1*a* permits an interrupt to the CPU 3 (control application 42), thus allowing the CPU 3 to set a new instruction value.

As described above, the interrupt control unit 1*a* can suitably make a notification of an interrupt to the CPU 3 according to a condition of the controlled object 91. Therefore, an OS run on the CPU 3 will not execute an unnecessary interrupt processing, thus allowing the OS to concentrate on executing other applications. Further, a user of the control computing device 9 can save time and effort, because an interrupt is dynamically controlled without a need of setting control information in advance by the CPU 3 to the interrupt control unit 1*a*.

Third Embodiment

Figure 16:
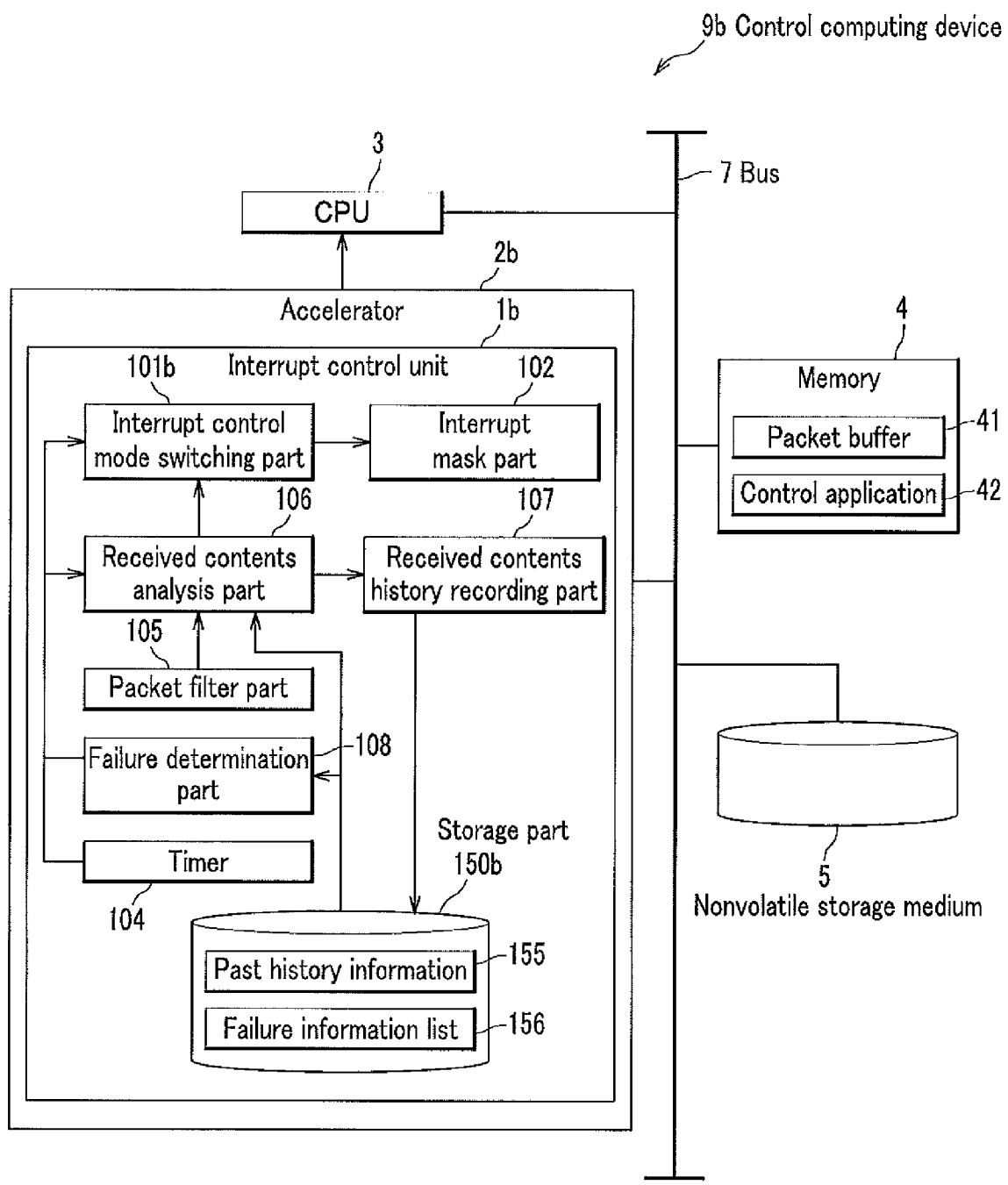
FIG. 16 is a diagram illustrating an example of a configuration of a control computing device according to a third embodiment.
Figure 17:
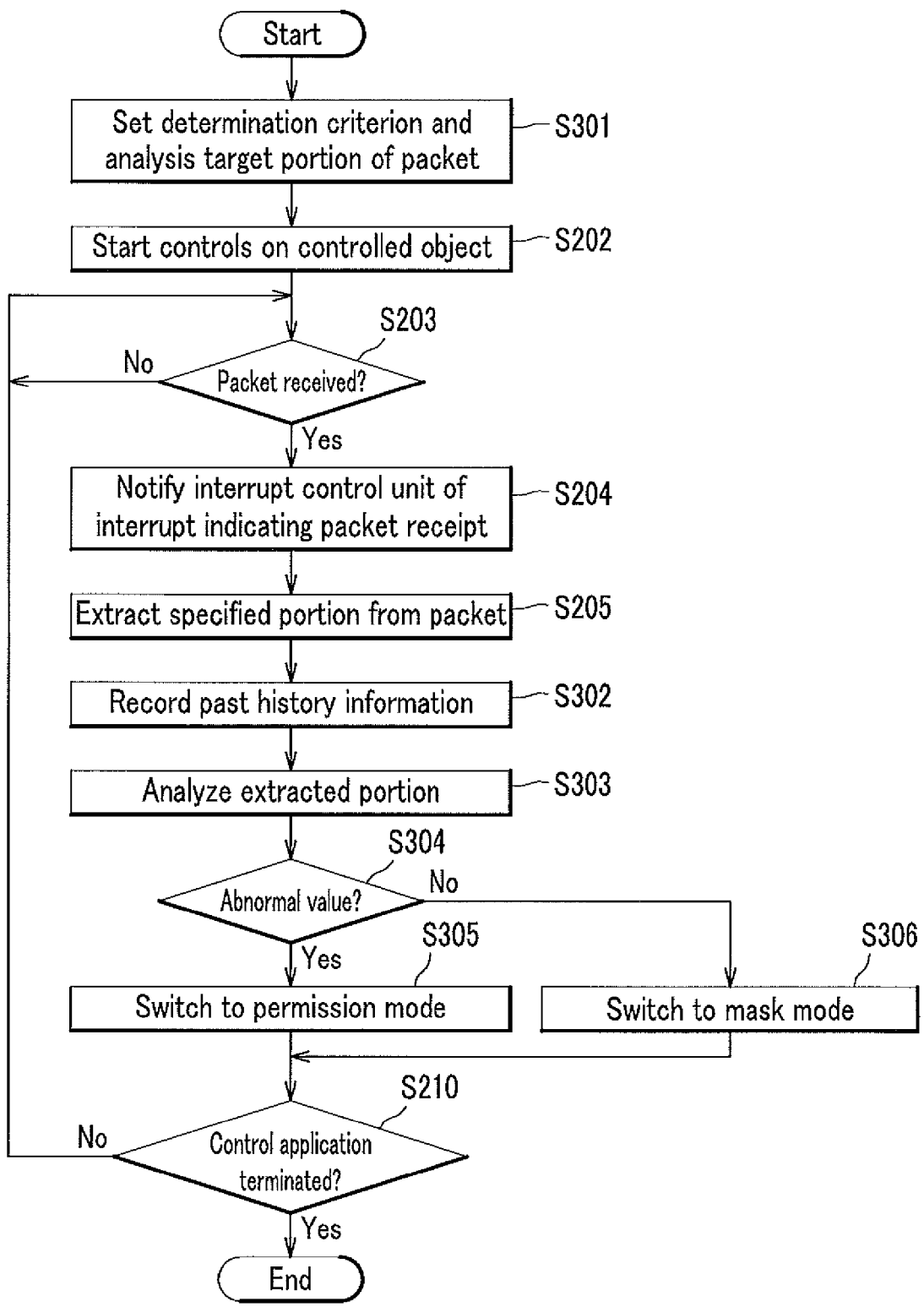
FIG. 17 is a flowchart illustrating a flow of an interrupt control processing according to the third embodiment.

Next is described a third embodiment of the present invention with reference to FIG. 16 and FIG. 17. In the third embodiment, an interrupt to the CPU 3 is permitted when a failure is detected with regard to contents of a packet or a state of receiving a packet.

<System Configuration>

FIG. 16 is a diagram illustrating an example of a configuration of a control computing device according to a third embodiment. In FIG. 16, same reference numbers are used for the components having substantially the same as those shown in FIG. 9, and description thereof is omitted herefrom.

If the failure determination part 108 of the interrupt control unit 1*b* detects a failure in contents of a packet or a state of receiving a packet, the failure determination part 108 notifies the interrupt control mode switching part 101*b* of the failure. The interrupt control mode switching part 101*b* makes the interrupt mask part 102 set the interrupt control mode to the permission mode and notify an interrupt from the accelerator 2*b* to the CPU 3.

In FIG. 16, a control table stored in the nonvolatile storage medium 5 is not shown.

The failure determination part 108 determines whether or not there is a failure by determining whether or not specified contents (a property value) of a received packet are equal to or larger or smaller than a previously-set value. A method of specifying a target portion includes the method explained with reference to FIG. 10 to FIG. 12. Another method of determining whether or not there is a failure is that, if past received contents stored so far in the received contents history recording part 107 demonstrates a prescribed tendency, it is determined that there is a failure. For example, the failure determination part 108 determines that there is a failure, if property values in recently-received packets fluctuate in a cycle different from that of older packets or do not fluctuate periodically.

The failure determination part 108 may determine whether or not there is a failure, also using a determination criterion on a packet receipt. For example, the failure determination part 108 determines that there is a failure, if a packet does not comply with a prescribed protocol format or has a size larger than the specified maximum or smaller than the specified minimum. The failure determination part 108 may also determine that there is a failure, if a packet has not been received after a prescribed period of time has elapsed, or if a packet has been received before the prescribed period of time has elapsed, even though a communication is performed in a prescribed period of time.

Information stored in the past history information 155 of the storage part 150*b* may be similar to the received contents history 154 shown in FIG. 13 or may include, in addition to the received contents history 154, a size of a packet and a value of a protocol format.

A failure information list 156 (which may also be referred to as switching condition information) of the storage part 150*b* includes a criterion for determining a failure as described above in a list form. Such a criterion includes, for example, acceptable maximum and minimum values of a property value of a packet, acceptable maximum and minimum sizes of a packet, an acceptable receipt period, and a protocol format.

<Flowchart>

Next is a flow of an interrupt control processing according to the third embodiment with reference to FIG. 17 as well as FIG. 16 where necessary. In FIG. 17, same step numbers are used for the steps substantially the same as those shown in FIG. 15, and description thereof is omitted herefrom.

The received contents analysis part 106 sets a determination criterion of a value indicating a failure and used for determining an interrupt control mode switching and an analysis target portion of a packet for indicating which portion of the packet is to be analyzed and recorded (S301) The received contents analysis part 106 writes the set determination criterion in the failure information list 156 in a list form. The received contents analysis part 106 also sets the set analysis target portion of the packet in the packet filter part 105. The setting in S301 may be carried out by inputting contents to be set by a user via an input unit not shown or by sending a message from a program run on the CPU 3 via the bus 7.

Following S205, the received contents history recording part 107 records contents (a property value) described in the extracted analysis target portion, in the past history information 155 (S302). The received contents history recording part 107 may also record therein a size, a protocol format, or the like of a packet, in addition to the property value.

The received contents analysis part 106 references the past history information 155 to analyze the extracted portion of the packet (S303). The failure determination part 108 determines whether or not the contents of the received packet is a failure value, based on a result of the analysis made by the received contents analysis part 106 (S304) and notifies the interrupt control mode switching part 101b of a result of the determination. More specifically, the received contents analysis part 106 references the past history information 155 to analyze whether or not a property value or the like in the packet exceeds a determination criterion stored in the failure information list 156. The failure determination part 108 makes a determination in S304 based on the result of the analysis.

Following S304, if the contents are determined to represent a failure value (if Yes in S304), the interrupt control mode switching part 101b instructs the interrupt mask part 102 to switch the interrupt control mode to the permission mode. Upon the instruction, the interrupt mask part 102 switches the interrupt control mode to the permission mode (S305). Note that, if a packet indicates a failure, the CPU 3 (control application 42) needs to deal with the failure. It is therefore necessary to notify the CPU 3 that the packet indicates the failure.

Following S304, if the contents are not determined to represent a failure value (if No in S304), it is not necessary to notify the CPU 3 of an interrupt. The interrupt control mode switching part 101b instructs the interrupt mask part 102 to switch the interrupt control mode to the mask mode. Upon the instruction, the interrupt mask part 102 switches the interrupt control mode to the mask mode (S306).

Following S305 and S306, the interrupt control unit 1b performs S210 as explained with reference to FIG. 15.

Advantageous Effects of Third Embodiment

In the third embodiment, the interrupt control unit 1b permits an interrupt from the accelerator 2b to the CPU 3, while transmitting and receiving packets to and from the accelerator 2b in a fast period, if the interrupt control unit 1b is notified that either contents (a property value) of a packet or the controlled object 91 demonstrates a failure or that there is a failure in a communication. Permission of the interrupt enables the control application 42 executed by the CPU 3 to suitably deal with the failure. The control application 42 may deal with the failure by transmitting a stop instruction to the controlled object 91, notifying an upper server of the failure occurrence, or making a monitor or other display device connected to the control computing device 9 display the failure occurrence.

Fourth Embodiment

Figure 18:
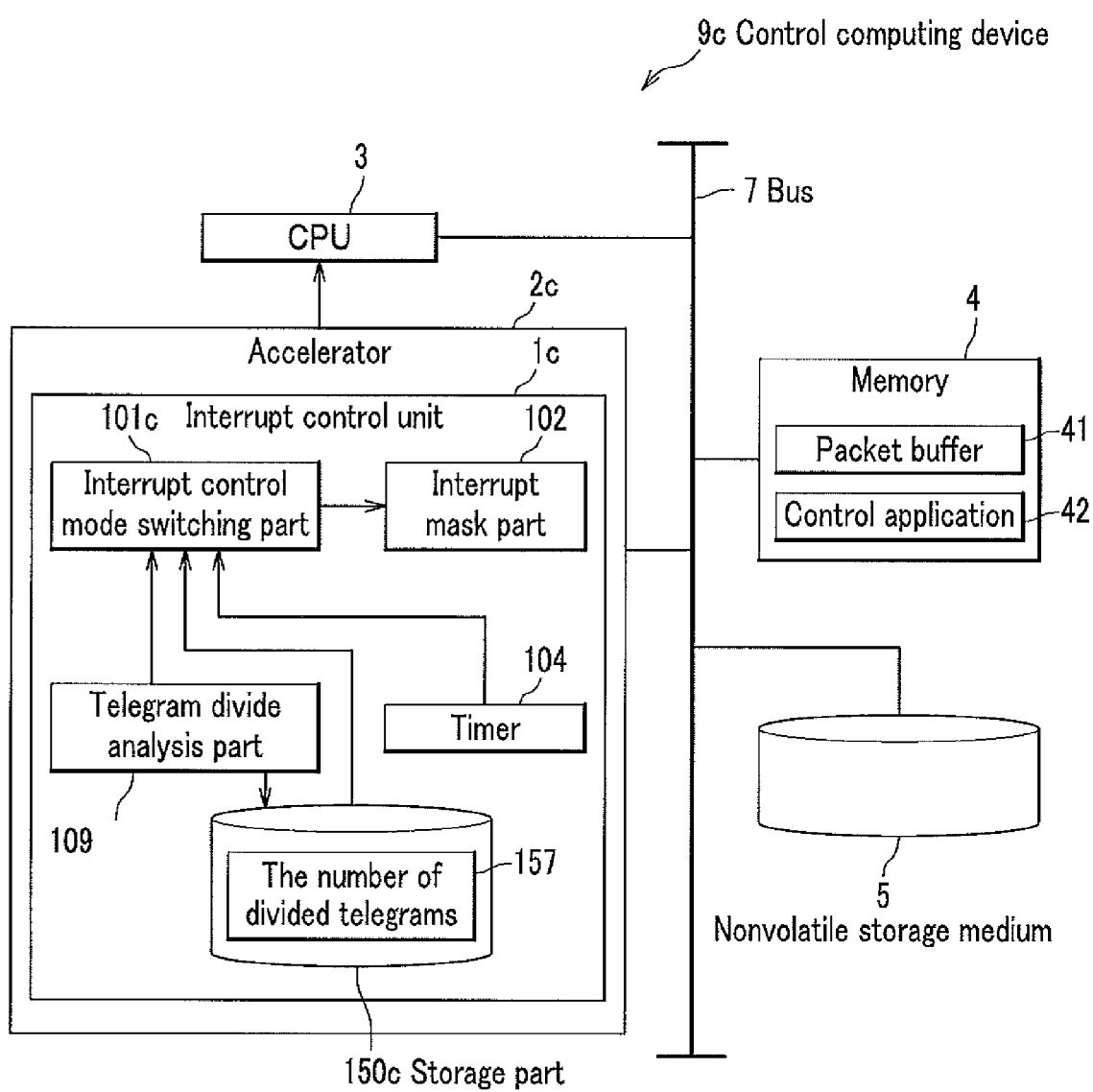
FIG. 18 is a diagram illustrating an example of a configuration of a control computing device according to a fourth embodiment.
Figure 19:
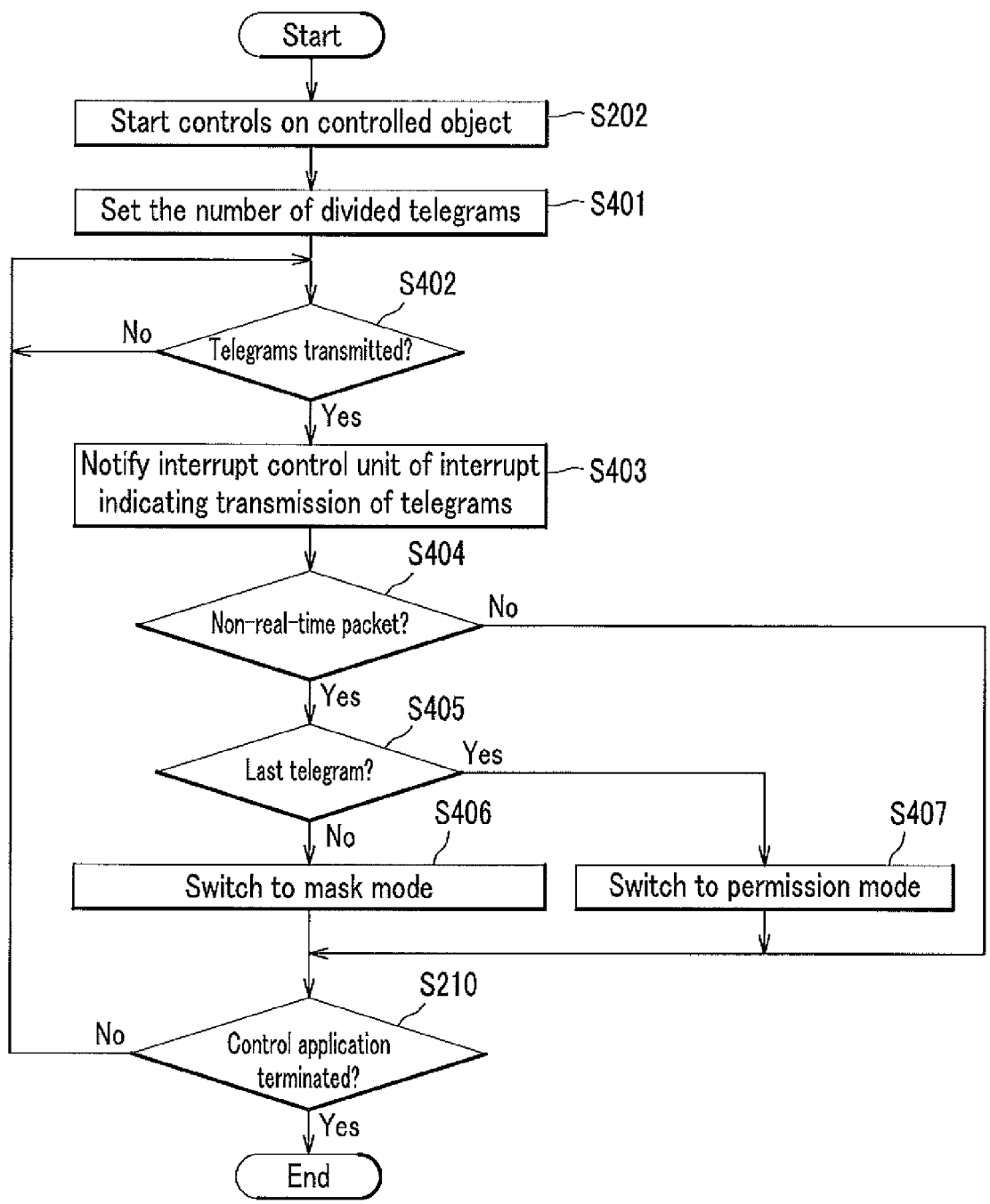
FIG. 19 is a flowchart illustrating a flow of an interrupt control processing according to the fourth embodiment.

Next is described a fourth embodiment of the present invention with reference to FIG. 18 and FIG. 19. In the fourth embodiment, if a packet divided into a plurality of telegrams is transmitted, the interrupt control mode is maintained to the mask mode until all the telegrams are transmitted, and, after all the telegrams are transmitted, the interrupt control mode is switched to the permission mode.

<System Configuration>

FIG. 18 is a diagram illustrating an example of a configuration of a control computing device according to the fourth embodiment. In FIG. 18, same reference numerals are used for the components having substantially the same functions as those of FIG. 4, and description thereof is omitted herefrom.

A telegram divide analysis part 109 of an interrupt control unit 1c divides a packet transmitted from an OS executed by the CPU 3 into a plurality of telegrams, computes the number of the divided telegrams, and stores the computed number of the divided telegrams in a storage part 150c.

An interrupt control mode switching part 101c counts the number of transmitted telegrams and compares the counted number with the number of divided telegrams 157 in the storage part 150c. Based on the comparison, the interrupt control mode switching part 101c determines whether all the telegrams are transmitted and makes the interrupt mask part 102 switch the interrupt control mode according to the determination.

The storage part 150c stores therein: the number of divided telegrams 157 (which may also be referred to as switching condition information); and, for example, an ID of a control packet, which are made to be paired with each other.

In FIG. 18, a control table stored in the nonvolatile storage medium 5 is not shown.

In a protocol in which a packet to be transmitted to the control network 92 (see FIG. 2 and FIG. 3) is configured by a plurality of telegrams, one may want to transmit a non-real-time packet which is free from time constraint, unlike TCP/IP (Transmission Control Protocol/Internet Protocol), from the control computing device 9c. The non-real-time packet is used for diagnosing and monitoring the controlled object 91 (see FIG. 2 and FIG. 3), confirming an operation status, or the like. The non-real-time packet tends to have a relatively large packet size. Such a large-sized non-real-time packet is, for example, divided into some pieces each of which can be included in a telegram. The divided pieces in the telegrams are transmitted a plurality of times to one given destination.

At this time, the telegram divide analysis part 109 counts the number of divided telegrams. During transmission of the telegrams, the interrupt control mode switching part 101c makes the interrupt mask part 102 mask an interrupt from the accelerator 2c to the CPU 3.

<Flowchart>

Next is described a flow of an interrupt control processing according to the fourth embodiment with reference to FIG. 19 as well as FIG. 18 where necessary.

FIG. 19 is a flowchart illustrating a flow of the interrupt control processing according to the fourth embodiment. In FIG. 19, same step numbers are used for the steps substantially the same as those shown in FIG. 15, and description thereof is omitted herefrom.

After S202, the telegram divide analysis part 109 sets the number of divided telegrams 157 by computing the number of divided telegrams 157 and storing the computed number of divided telegrams 157 in the storage part 150c (S401).

The accelerator 2c then determines whether or not the telegrams are to be transmitted (S402).

Following S402, if the telegrams are not determined to be transmitted (if No in S402), the accelerator 2c returns the processing to S402.

Following S402, if the telegrams are determined to be transmitted (if Yes in S402), the accelerator 2c notifies the interrupt control unit 1c of an interrupt indicating that the telegrams are to be transmitted (S403).

The telegram divide analysis part 109 analyzes a prescribed portion of a packet to be transmitted (S403), determines whether or not the packet is a non-real-time packet (S404), and notifies a result of the determination to the interrupt control mode switching part 101c.

Following S404, if the packet is not determined to be a non-real-time packet (if No in S404), the interrupt control unit 1c advances the processing to S210.

Following S404, if the packet is determined to be a non-real-time packet (if Yes in S404), the telegram divide analysis part 109 compares the transmitted number of the telegrams having been counted with the number of divided telegrams 157 in the storage part 150c. Based on the comparison, the telegram divide analysis part 109 determines whether or not a given telegram just having been transmitted is the last telegram among all of the telegrams (S405) and notifies the interrupt control mode switching part 101c of a result of the determination.

Following S405, if the just-transmitted telegram is not determined to be the last telegram (if No in S405), the interrupt control mode switching part 101c instructs the interrupt mask part 102 to switch the interrupt control mode to the mask mode. Upon the instruction, the interrupt mask part 102 switches the interrupt control mode to the mask mode (S406). At this time, if the interrupt control mode is already set to the mask mode, the interrupt control mode switching part 101c does not perform anything.

Following S405, if the just-transmitted telegram is determined to be the last telegram (if Yes in S405), the interrupt control mode switching part 101c instructs the interrupt mask part 102 to switch the interrupt control mode to the permission mode such that the CPU 3 can receive an acknowledgment or the like from a destination of the packet Upon the instruction, the interrupt mask part 102 switches the interrupt control mode to the permission mode (S406). At this time, if the interrupt control mode is already set to the permission mode, the interrupt control mode switching part 101c does not perform anything. After S406, if the interrupt control unit 1c or the CPU 3 detects a receipt of an acknowledgment from the destination of the packet, the interrupt control mode switching part 101c may make the interrupt mask part 102 to switch the interrupt control mode to the mask mode.

After S406 and S407, the interrupt control unit 1c performs S210.

Advantageous Effects of Fourth Embodiment

In the fourth embodiment, a processing as follows is possible in transmitting a non-real-time packet used for diagnosing and monitoring the controlled object 91 (see FIG. 2 and FIG. 3), confirming an operation status, or the like: the interrupt control unit 1c divides a non-real-time packet into a plurality of telegrams while transmitting and receiving packets to and from the accelerator 2 in a fast period; and the interrupt control unit 1c can mask a notice of an interrupt from the accelerator 2c to the CPU 3 until the entire non-real-time packet (all telegrams) is transmitted or received. This is advantageous because the interrupt control unit 1c does not notify the CPU 3 of an unnecessary interrupt while the non-real-time packet divided into a plurality of telegrams is transmitted or received, which allows an OS executed by the CPU 3 to concentrate on executing other applications or the like.

Fifth Embodiment

<System Configuration>

Figure 20:
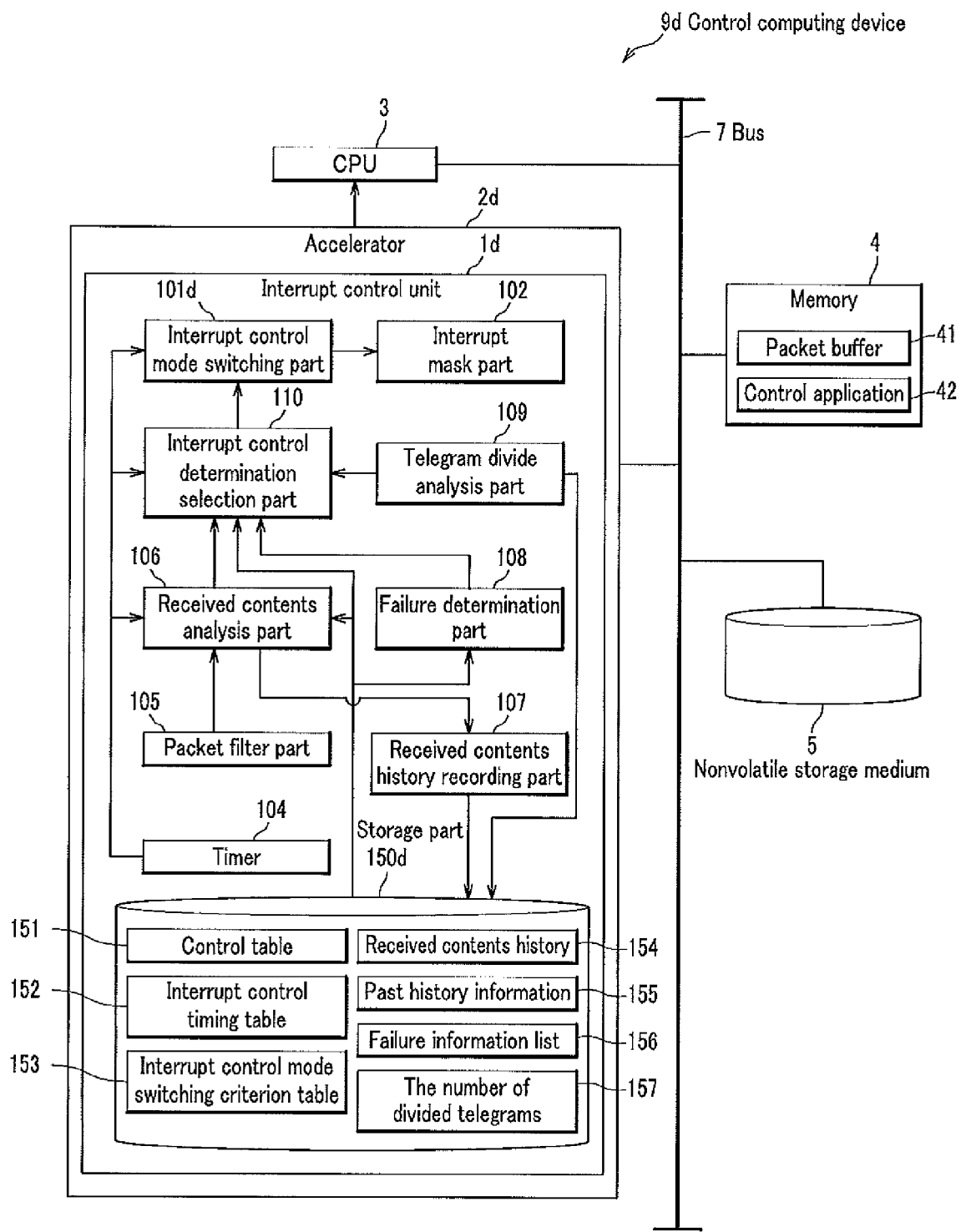
FIG. 20 is a diagram illustrating an example of a configuration of a control computing device according to a fifth embodiment.

FIG. 20 is a diagram illustrating an example of a configuration of a control computing device according to a fifth embodiment. In FIG. 20, same reference numerals are used for the components having substantially the same functions as those of the above-described embodiments, and description thereof is omitted herefrom.

An interrupt control determination selection part 110 of an interrupt control unit 1d of an accelerator 2d of a control computing device 9d calculates a logical add of the following determination results obtained: in S208 of FIG. 15 performed by the received contents analysis part 106; in S304 of FIG. 17 performed by failure determination part 108; and in S405 of FIG. 19 performed by the telegram divide analysis part 109. The interrupt control determination selection part 110 notifies the interrupt control mode switching part 101d of the calculated logical add. Further, the interrupt control determination selection part 110 may calculate a logical add of the aforementioned determination results and a determination result obtained in S106 of FIG. 8 performed by control information analysis part 103 not shown in FIG. 20 but shown in FIG. 4 and notify the interrupt control mode switching part 101d of the calculated logical add.

The storage part 150d stores therein information stored in the storage parts 150, 150a, 150b, 150c in the above-described embodiments.

A processing performed by the control computing device 9d shown in FIG. 20 is similar to the processings in the above-described embodiments, and detailed description and drawings thereof is omitted herefrom.

For example, the interrupt control unit 1d performs S201 to S208 of FIG. 15, S304 of FIG. 17, and S401 to S405 of FIG. 19 in this order. The interrupt control determination selection part 110 then calculates a logical add of determination results obtained in S106, S208, S304, S404, and S405 and notifies the interrupt control mode switching part 101d of the calculated logical add.

The interrupt control unit 1d may perform S205 to S209 of FIG. 15, S304 to S306 of FIG. 17, and S401 to S407 of FIG. 19 in series.

Further, the interrupt control unit 1d may perform S201 to S209 of FIG. 15, S204 to S306 of FIG. 17, and S202 to S407 of FIG. 19 in parallel. In this case, for example, respective independent steps are processed in parallel each as a functional module in hardware, using FPGA (Field Programmable Gate Array), CPLD (Complex Programmable Logic Device), ASIC (Application Specific Integrated Circuit), or the like. Then a logical add of determination results is obtained.

Further, the interrupt control unit 1d may perform, for example, S101 to S106 of FIG. 8, S205 to S208 of FIG. 15, S304 of FIG. 17, and S401 to S405 of FIG. 19 in this order. The interrupt control determination selection part 110 then calculates a logical add of respective determination results obtained in S106, S208, S304, S404, and S405 and notifies the interrupt control mode switching part 101d of the calculated logical add.

The interrupt control unit 1d may perform S101 to S107 of FIG. 8, S205 to S209 of FIG. 15, S304 to S306 of FIG. 17, and S401 to S407 of FIG. 19 in series.

The interrupt control unit 1d may perform S101 to S107 of FIG. 8, S201 to S209 of FIG. 15, S204 to S306 of FIG. 17, and S202 to S407 of FIG. 19 in parallel. In this case, respective independent steps are processed in parallel each as a functional module in hardware, using FPGA, CPLD, ASIC, or the like.

Note that not all of the received contents analysis part 106, failure determination part 108, and telegram divide analysis part 109 are required herein. Further, a plurality of determination parts in which different thresholds are set may be provided herein.

The above-described components 101 to 110 included in the control unit 1, 1a to 1d respectively shown in FIG. 4, FIG. 9, FIG. 16, FIG. 18, and FIG. 20 are embodied as, for example, functional modules in hardware such as FPGA, CPLD, ASIC, or the like included in the accelerator 2, 2a to 2d. Or, the interrupt control units 1, 1a to 1d themselves may be embodied as hardware such as FPGA, CPLD, ASIC, or the like, or an IP core. Alternatively, the components 101 to 110 may be embodied by executing an interrupt control program stored in a ROM or the like of the accelerator 2, 2a to 2d, by a processing unit of the accelerator 2, 2a to 2d.

In this embodiment, the interrupt control units 1, 1a to 1d are included in the accelerators 2, 2a to 2d, respectively. However, hardware such as FPGA, CPLD, and ASIC included in the interrupt control unit 1, 1a to 1d may be included in the CPU 3 and may be executed.

The interrupt control units 1, 1a to 1d may be physically independent from the accelerators 2, 2a to 2d and the CPU 3.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:

1. An interrupt control apparatus for providing controls on an interrupt from an accelerator for communication processing to a CPU, by switching interrupt control modes between an interrupt permission mode and an interrupt mask mode, based on a signal transmitted to or received from an outside controlled object, comprising:
a storage part that stores therein an interrupt control timing table containing a switching condition information in which a condition of the interrupt control modes based on communication contents indicating a state of the controlled object, a temporal condition for determining whether or not the switching condition of the interrupt control mode is satisfied, and an appropriate interrupt control mode to which the interrupt control mode is to be switched if the switching condition of the interrupt control mode is satisfied;
a transmission/reception part that transmits or receives the signal to or from the interrupt control apparatus; and
an interrupt control mode switching part that is coupled to the storage part and the transmission/reception part and that switches the mode of the interrupt control to the CPU, based on the transmitted or received signal and information on the switching condition stored in the storage part.

2. The interrupt control apparatus according to claim 1, wherein, of the signals transmitted to and received from outside, the signal received from outside switches the mode of the interrupt control, and
wherein the switching condition information includes whether or not a value included in the signal becomes a prescribed value at a prescribed time.

3. The interrupt control apparatus according to claim 1, wherein the signal is a control signal transmitted to or received from a servo amplifier or a servomotor.

4. The interrupt control apparatus according to claim 1, wherein the interrupt control apparatus is included in the accelerator for communication processing.

5. The interrupt control apparatus according to claim 1, wherein the interrupt control apparatus is included in an information processing device.

6. The interrupt control apparatus according to claim 1, wherein the interrupt control mode switching part switches the interrupt control mode based on a difference between an actual current value and a target value with respect to an instruction value relevant to the outside controlled object included in the communication contents.

7. The interrupt control apparatus according to claim 1, wherein, the interrupt control mode switching part determines that there is a failure, if an actual current value with respect to an instruction value relevant to the outside controlled object included in the communication contends does not reach a target value even when a prescribed period of time has elapsed after a planned estimated time of reaching the target value, and thereby switches the interrupt control mode to the interrupt permission mode.

8. An interrupt control system, comprising:
a controlled object;
an interrupt control apparatus coupled to the controlled object for providing controls on an interrupt from an accelerator for communication processing to a CPU, by switching interrupt control modes between an interrupt permission mode and an interrupt mask mode, based on a signal transmitted to or received from the controlled object; and
an interface for enabling communication between the controlled object and the interrupt control apparatus,
wherein the interrupt control apparatus includes:
a storage part that stores therein an interrupt control timing table containing a switching condition of the interrupt control modes based on communication contents indicating a state of the controlled object, a temporal condition for determining whether or not the switching condition of the interrupt control mode is satisfied, and an appropriate interrupt control mode to which the interrupt control mode is to be switched if the switching condition of the interrupt control mode is satisfied;
a transmission/reception part that transmits or receives the signal to or from the interrupt control apparatus; and
an interrupt control mode switching part that is coupled to the storage part, and the transmission/reception part and that switches the mode of the interrupt control to the CPU, based on the transmitted or received signal and information on the switching condition stored in the storage part.

9. An interrupt control method performed by an interrupt control apparatus for providing controls on an interrupt from an accelerator for communication processing to a CPU, by switching interrupt control modes between an interrupt permission mode and an interrupt mask mode, based on a signal transmitted to or received from an outside controlled object, comprising:

storing an interrupt control timing table containing a switching condition part of the interrupt control modes based on communication contents indicating a state of the controlled object, a temporal condition for determining whether or not the switching condition of the interrupt control mode is satisfied, and an appropriate interrupt control mode to which the interrupt control mode is to be switched if the switching condition of the interrupt control mode is satisfied;

analyzing contents of a received packet and setting a determination criteria for an interrupt control mode switching within the interrupt control timing table; and switching the mode of the interrupt control to the CPU, based on the signal transmitted to or received from outside and the switching condition information in the storage part.

10. An interrupt control program for causing a computer to perform the interrupt control method according to claim 9.

11. An interrupt control apparatus for providing controls on an interrupt from an accelerator for communication processing to a CPU, by switching interrupt control modes between an interrupt permission mode and an interrupt mask mode, based on a signal transmitted to or received from an outside controlled object, comprising:

a storage part that stores therein an interrupt control timing table containing a plurality of switching conditions, where each switching condition of the plurality of switching conditions defines conditions which must be satisfied to permit a switch of the interrupt control mode to a designated interrupt control mode, each said each switching condition including interrupt control timing fields of: an elapsed time which must pass as measured from a predetermined reference; a predefined condition; and the designated interrupt control mode to switch to if at least one of the elapsed time and the predefined condition is satisfied;

a transmission/reception part that transmits or receives the signal to or from the interrupt control apparatus; and an interrupt control mode switching part that is coupled to the storage part and the transmission/reception part, and that switches the mode of the interrupt control to the CPU, based on the transmitted or received signal and at least one switching condition of the plurality of switching conditions having been satisfied.

* * * * *